United States Patent [19]

Suzuki

[11] Patent Number: 5,673,380
[45] Date of Patent: Sep. 30, 1997

[54] PARALLEL PROCESSING OF CALCULATION PROCESSOR AND DISPLAY PROCESSOR FOR FORMING MOVING COMPUTER GRAPHIC IMAGE IN A REAL-TIME MANNER

[75] Inventor: Kaori Suzuki, Kawasaki, Japan

[73] Assignee: Fujitsu Limited, Kawasaki, Japan

[21] Appl. No.: 707,910

[22] Filed: Sep. 3, 1996

Related U.S. Application Data

[63] Continuation of Ser. No. 360,946, Dec. 21, 1994, abandoned.

[30] Foreign Application Priority Data

Feb. 15, 1994 [JP] Japan ................... 6-018105

[51] Int. Cl.[6] ................... G06T 13/00
[52] U.S. Cl. ............. 395/173; 395/133; 395/502
[58] Field of Search ................... 395/133, 136, 395/137, 138, 173, 174, 175, 502, 503, 505, 507, 512, 526; 345/121, 122

[56] References Cited

U.S. PATENT DOCUMENTS

| 5,010,515 | 4/1991 | Torborg, Jr. | 395/163 |
| 5,224,210 | 6/1993 | Pinedo et al. | 395/164 |
| 5,299,309 | 3/1994 | Kuo et al. | 395/162 |
| 5,392,393 | 2/1995 | Deering | 395/162 |
| 5,394,519 | 2/1995 | Bodin | 395/131 |
| 5,440,746 | 8/1995 | Lentz | 395/163 |
| 5,448,694 | 9/1995 | Wada et al. | 395/152 |
| 5,471,579 | 11/1995 | Kimura et al. | 395/163 |
| 5,481,669 | 1/1996 | Poulton et al. | 395/164 |
| 5,513,130 | 4/1996 | Redmond | 364/578 |
| 5,544,283 | 8/1996 | Kaufman et al. | 395/124 |

OTHER PUBLICATIONS

Lister et al., Fundamentals of Operating Systems, Springer-Verlag New York Inc., 1993, pp. 17-32.
Foley et al., Computer Graphics: Principle and Practice, Addison-Wesley, 1990, pp. 1057-1058.

*Primary Examiner*—Phu K. Nguyen
*Assistant Examiner*—Stephen Hong
*Attorney, Agent, or Firm*—Staas & Halsey

[57] ABSTRACT

A computer graphics image is moved on a display by executing an image data calculating process and an image data displaying process in parallel. A calculating section calculates moving image data and accumulates the result into a calculation result accumulating section. A display section forms and displays image data on the basis of the moving image data read out from the calculation result accumulating section. A control section controls the processes of the calculating section and display section to be executed in parallel. To provide parallel processing, the control section first sends an activation command to the calculating section, thereby allowing the calculation of the moving image data to be previously executed. After a predetermined amount of calculation result, for example, the calculation result of one frame is accumulated in the calculation result accumulating section, the control section sends an activation command to the display section thereby starting the display of the moving image.

13 Claims, 17 Drawing Sheets

```
color : red location ─┬─ x : 0.0
          ├─ y : 1.0
          └─ z : 0.5 scale ─┬─ x : 1.0
       ├─ y : 0.5
       └─ z : 0.3
```

FIG. 12

| COLOR DATA |
|---|
| POSITION X COORDINATE VALUE |
| POSITION Y COORDINATE VALUE |
| POSITION Z COORDINATE VALUE |
| X-DIRECTION SPAN VALUE |
| Y-DIRECTION SPAN VALUE |
| Z-DIRECTION SPAN VALUE |

FIG. 13

| |
|:---:|
| red |
| 0.0 |
| 1.0 |
| 0.5 |
| 1.0 |
| 0.5 |
| 0.3 |
| blue |
| 1.2 |
| 2.9 |
| 0.3 |
| 1.0 |
| 0.5 |
| 0.5 |

FIRST DATA: red through 0.3

SECOND DATA: blue through 0.5

DATA STRUCTURE

PARALLEL PROCESSING OF CALCULATION PROCESSOR AND DISPLAY PROCESSOR FOR FORMING MOVING COMPUTER GRAPHIC IMAGE IN A REAL-TIME MANNER

This application is a continuation of application Ser. No. 08/360,946, filed Dec. 21, 1994, now abandoned.

BACKGROUND OF THE INVENTION

The present invention relates to a method and apparatus for forming a moving image by using computer graphics and, more particularly, to a method and apparatus for forming and displaying a moving image separately with respect to a calculating process of image data and a display process of the image data.

In general, in the case where a moving image such as an image, figure, or the like which changes with the elapse of time, is formed and displayed by using computer graphics (hereinafter, referred to as "CG"), it is necessary to first calculate and form 3-dimensional data of an object to be displayed and to subsequently form image data of a screen to be actually displayed from the calculation data.

In a case of CG animation, for example, a position, a shape, and the like of an object in 3-dimensional space for a period of display time are first calculated. Image data is subsequently formed as a 2-dimensional projection which is obtained by seeing the calculated object from a certain viewpoint, and is displayed on a display screen.

According to a conventional moving image forming apparatus, therefore, as shown in FIG. 1, moving image data at a certain time (t) is first calculated and formed by a calculating process 100. The calculation result is then sent to a display process 110, thereby forming and displaying the image data. The present time (t) is increased by a time managing section 120 and the processing routine advances. Successive processes of the calculating process 100 and the display process 110 are repeated with respect to the next time, thereby forming and displaying a moving image.

In the moving image formation of such conventional successive processes in which the calculating process and the display process are sequentially repeated in accordance with the order, e.g., in a case of forming and displaying moving images of frames F1 to Fn as shown in FIG. 2, a time obtained by adding a time Td (required to display the data) to a time Tc (required to calculate the data formation) is necessary until one frame of the moving image is displayed. With respect to the moving images of (n) frames, the following time is needed.

$$T = \sum_{i=1}^{n} (Tci + Tdi)$$

Since the number of objects as processing targets and a complication of data differ depending on the scene, the calculating time for the data formation and the display time are variable. In order to display continuous frame images at predetermined time intervals, there is used a method such that the calculation for the data formation and the display process are once executed with respect to all frames and the images are stored as image data into a memory and, after that, the image data is reproduced. According to the above method, however, the moving image could be seen only after all processes were finished. There is also a problem such that a memory having a large capacity is needed to preserve the image data and the above method cannot be adapted to an editing operation in which a display of the characteristics of the moving image is required by trial and error.

SUMMARY OF THE INVENTION

According to the present invention, there are provided a method and apparatus for forming a moving image, in which a time period necessary to form and display a moving image per frame can be reduced and the moving image can be formed and displayed by a real-time process without executing a batch process.

A moving image forming apparatus of the invention comprises a calculating section, a display section, a calculation result accumulating section, and a control section. The calculating section calculates and forms moving image data. The calculation result accumulating section accumulates the moving image data formed by the calculating section. The display section displays the moving image data on the basis of the moving image data from the calculation result accumulating section. Further, the control section allows the processes of the calculating section and the display section to be executed in parallel.

The control section first sends an activation command to the calculating section, thereby allowing the calculation of the moving image data to be initially executed. After a predetermined amount of the total calculation result, for example, the calculation result of one frame is accumulated in the calculation result accumulating section, the control section sends an activation command to the display section, thereby allowing the display of the moving image data to be started. In the case of displaying the moving image data at regular time intervals, the control section sends a display command to the display section at every predetermined time Td, thereby switching and displaying the moving image data at predetermined time intervals. In this case, during the display of the moving image data by the display section, if the calculation of the moving image data to be used in the next display is not finished in the calculating section, the same moving image data as that which is being displayed at present is continuously displayed. On the other hand, in the case where the display process of the moving image data by the display section is not finished for a predetermined display time Td, the display process by the display section is forcibly stopped and the display mode is shifted to the display of next moving image data. It is desirable to store the calculation result of the moving image data by the calculating section into the calculation result accumulating section as a data structure including a name of a display function and data which is designated by the display function name. In this case, the display section sequentially reads out the data structures from the calculation result accumulating section and repeats the display process of the data in accordance with the display function names in the data structures. The calculation of the moving image data by the calculating section and the display of the moving image data by the display section are fundamentally performed on a frame unit basis. The calculating section, display section, and control section are executed by a multiprocess which is realized by an operating system on a computer.

The present invention also provides a moving image forming method comprising:
- a calculating step of calculating and forming moving image data;
- a calculation result accumulating step of accumulating the moving image data formed by the calculating step into a memory apparatus; and
- a displaying step of displaying a moving image in parallel with the calculation of the moving image data on the basis of the moving image data read out from the memory apparatus.

The method and apparatus for forming moving images of the present invention execute a multiprocess in which processes are divided into a calculating process to form data and a display process to display the data, and both of the calculation and the display are simultaneously executed in parallel by those two processes. A calculation result storing section, as a buffer to store the calculation result, is provided between the calculating process and the display process and the data is transmitted and received between the calculating process and the display process.

Assuming that Tic denotes a time which is required to calculate the moving image of a frame Fi and Tdi denotes a time which is required to display the frame Fi, display time necessary for the conventional successive processes is derived by the following equation.

$$T = \sum_{i=1}^{n} (Tci + Tdi)$$

According to the invention, on the other hand, in the case where the calculating process precedes the display process and an amount of calculation buffer is sufficient and no waiting time occurs, the display time is as follows.

$$T = \sum_{i=1}^{n} Tcd$$

That is, the processing time necessary for the parallel processes of the present invention can be reduced to ½ of that of those conventional successive processes.

In the normal display of moving images, it is necessary to display the moving images at predetermined time intervals in a manner such as, for example, 30 frames per second. In this case, according to the invention, the calculating process and the display process are controlled by a time control section. Namely, the display command is sent to the display process at regular time intervals, thereby displaying frames at regular intervals. In the case where the calculating process is not finished within the display time, the image which is being displayed at present is continuously displayed. In the case where the display process does not finish the display within a predetermined display time, contrarily, the time control section instructs the display process to stop displaying.

According to the invention, further, in addition to the ordinary data, the display function name is included as a data structure which is written as a calculation result of the calculating process into a calculation result accumulating section. In the case where the display function name is included in the data as mentioned above, different data can be handled by a single function on the side on which the display process is executed and no complicated dividing process is needed, so that the processes can be easily handled.

The above and other objects, features, and advantages of the present invention will become more apparent from the following detailed description with reference to the drawings.

BRIEF DESCRIPTION OF THE DRAWINGS

FIG. 12 is an explanatory diagram of a data structure which is stored in a file unit;

FIG. 13 is an explanatory diagram of a data storing state of the file unit;

DETAILED DESCRIPTION OF THE PREFERRED EMBODIMENTS

Figure 3:
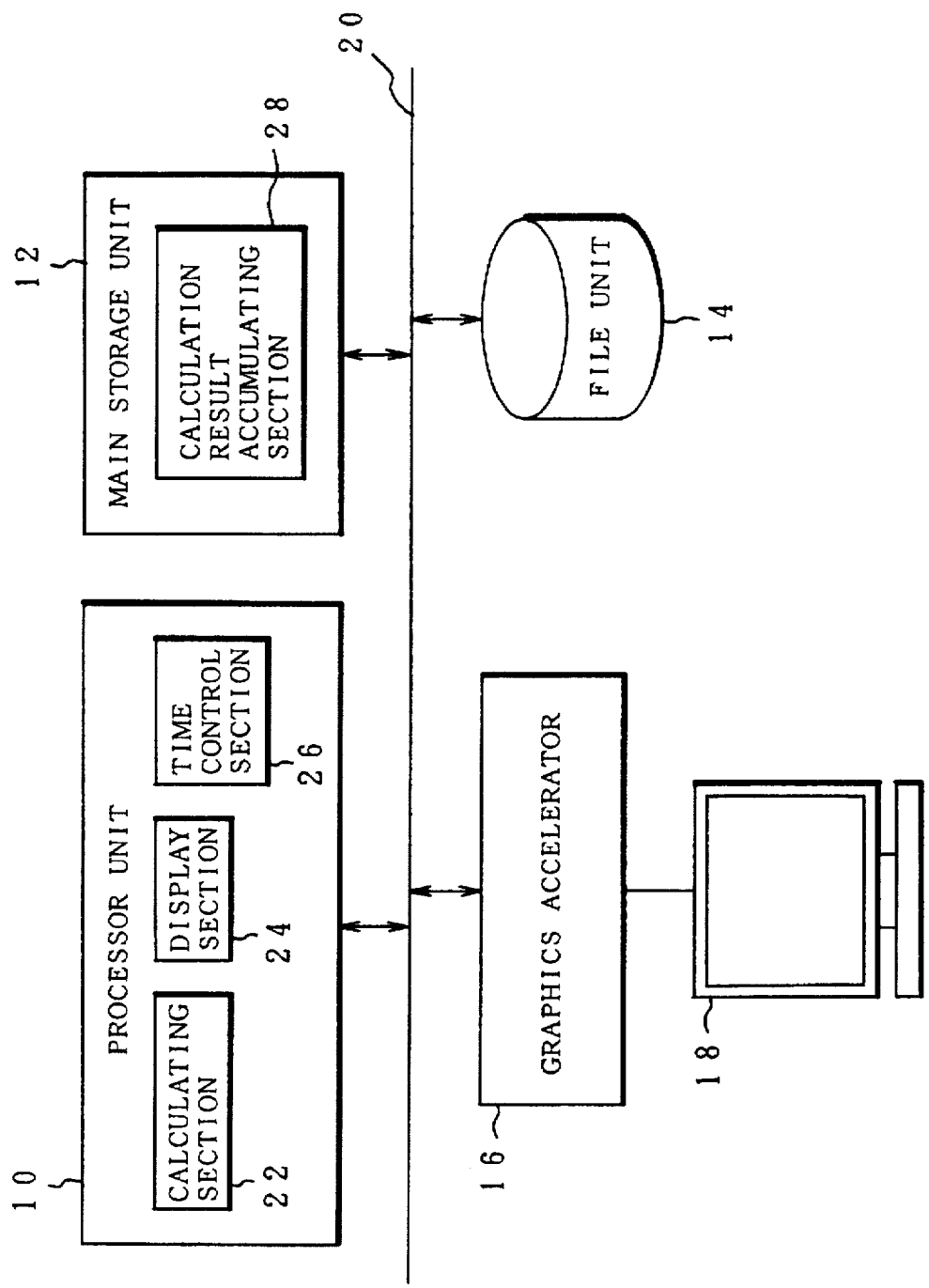
FIG. 3 is a block diagram of a construction of an apparatus to which the present invention is applied.

FIG. 3 shows an example of a hardware construction of a moving image forming apparatus of the invention to be realized as computer graphics. As a processor unit 10, a processor unit in which two or more processors can be simultaneously executed in parallel is used. A main storage unit 12 and a file unit 14 are connected to a bus 20 of the processor unit 10. A graphics accelerator 16 is further connected to the bus 20 of the processor unit 10 so as to enable a moving image to be displayed onto a color display 18. Such a hardware construction is a fundamental construction of the moving image forming apparatus of the invention. In addition to the above component elements, a user interface such as keyboard, mouse, pointing device, and the like to perform the transmission and reception with the operator for an editing operation and a hardware such as a printer or the like are properly provided as necessary.

In the processor unit 10, a calculating section 22, a display section 24, and a time control section 26 are provided in order to realize a process for the moving image formation of the invention to be realized as an operating system. The calculating section 22 calculates a position, shape, or the like of an object to be displayed at a certain time in a virtual 3-dimensional space by using a data base stored in the file unit 14 or the like, thereby obtaining moving image data. The calculating process of the moving image data by the calculating section 22 is performed on a frame unit basis (on a picture unit basis). The moving image data formed of calculation by the calculating section 22 is stored into a calculation result accumulating section 28 which is provided in the main storage unit 12 and functions as a calculating buffer. The calculation result accumulating section 28 can be provided in the main storage unit 12 or can be also provided in the file unit 14.

The display section 24 of the processor unit 10 reads out the moving image data stored in the calculation result accumulating section 28 of the main storage unit 12 and converts the moving image data of the object obtained as position and shape in the 3-dimensional space to the 2-dimensional projection data which is seen from a certain viewpoint, thereby forming drawing data comprising a group of constructional elements serving as a base of the object to be drawn. The drawing data formed by the display section 24 corresponds to a PHIGS (Programmer's Hierarchical Interactive Graphics Standard) of a graphics library which is often used in, for example, a 3-dimensional CAD or the like. That is, in the PHIGS, the construction serving as a base of the object to be drawn is stored in a hierarchy manner into a kind of data bases called as a central structure. Such a data base is called a display list. The actual drawing based on the display list obtained as drawing data by the display section 24 is realized by the graphics accelerator 16. The display section 24 further executes the calculations with respect to various kinds of rendering processes. As ordinary rendering processes, there are a shape deformation by a modeling conversion, a coloring by a color calculation, a change in watching range by a calculation of a visual field, a limitation of an area by clipping, a change in watching direction by coordinate conversion, an elimination of notches to be executed as anti-aliasing, a flat shading, and the like. As rendering processes of a high quality, various kinds of algorithms such as phon shading regarding a color expression of dark/light, $\alpha$ blending regarding an expression of transparency, radiocity for expressing a shadow or a reflection of the light or the like by calculating an influence by a light beam, various kinds of mappings such as shadow mapping, bump mapping, refresh mapping, and the like regarding an image construction, fog for expressing fog or mist, particle for performing an expression of particles or cloud, metaball for expressing a free curved surface or a soft body, and the like are included. In this instance, in order to reduce a processing burden of the display section 24, various kinds of rendering processes which are realized by the OS can be also provided on the graphics accelerator 16 side.

The graphics accelerator 16 reads out the drawing data obtained by the processor unit 10, for example, a display list and converts to what is called polygon data including vertex coordinates of micro polygons which express an object. The accelerator 16 subsequently forms pixel data of each vertex of the polygon data and further forms pixel data to interpolate between the pixel data of the vertexes and finally forms a dot pattern of the moving image, thereby displaying the moving image on a frame unit basis on the color display 18. In order to display the moving image which moves smoothly without a feeling of physical disorder in the moving image display of the color display 18, a display speed of 30 frames per second or higher is demanded.

The time control section 26 provided in the processor unit 10 controls a procedure for executing simultaneous parallel processes by the calculating section 22 and display section 24. The calculating process of the moving image data by the calculating section 22 is precedes the start of the moving image formation. That is, when an activation instruction of the moving image formation is input from an operator or the like, the time control section 26 generates an activation command to the calculating section 22 and starts the calculation of the moving image data. When a predetermined amount of calculation result of the moving image data is stored to the calculation result accumulating section 28 of the main storage unit 12 from the calculating section 22 which has precedingly operated, the time control section 26 generates the activation command to the display section 24, thereby starting the display process. Specifically speaking, when the calculation result of the moving image data of one frame is accumulated in the calculation result accumulating section 28, the control section 26 generates the activation command to the display section 24, thereby starting the display process.

In the embodiment, the time control section 26 further performs a time control so that the display interval of the moving images by the display section 24 is set to an equal interval. Specifically speaking, the control section 26 generates a display command to the display section 24 so that the display speed of the moving images to be displayed on the color display 18 is set to 30 frames per second. Therefore, in the case where the calculation result of the moving image data of the next frame, by the calculating section 22, is not obtained within the set time by the time control section 26, namely, in the case where it takes a long time for the calculation of the moving image data in the calculating section 22, the time control section 26 allows the display section 24 to display the same moving image as that which is being processed at present with respect to the next frame. On the contrary, in the case where the display process of the moving image by the display section 24 is not finished, i.e. when exceeding the set time to the time control section 26, the display process by the display section 24 is stopped at a time point reaching the set time and the operating mode is shifted to the display process of the next frame. On the other hand, the calculating section 22 is not time-controlled by the time control section 26, so that the calculation time of the moving image data differs every frame in accordance with the moving image contents.

Figure 4:
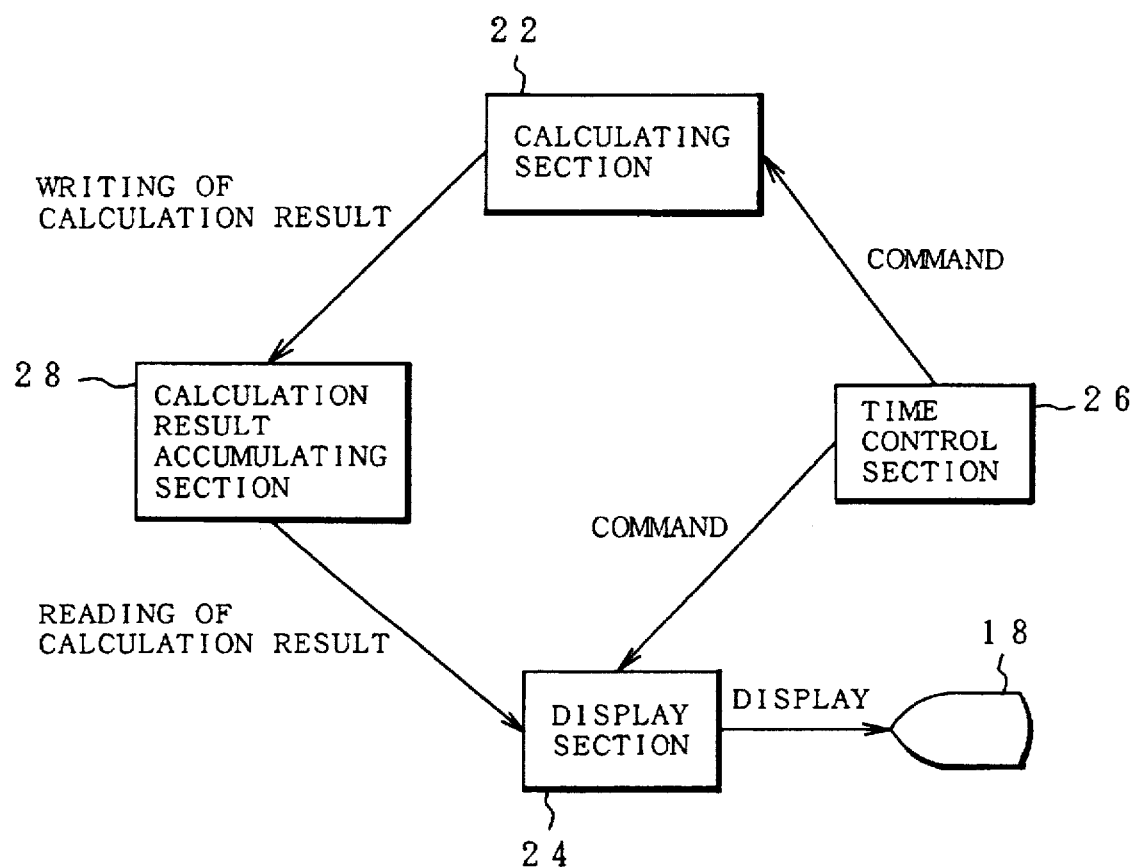
FIG. 4 is a functional block diagram of the first embodiment of the invention for displaying at regular intervals.

FIG. 4 is a functional block of the moving image forming apparatus of the invention which is realized by the hardware structure in FIG. 3. In this instance, the time control section 26 performs the whole control of the calculating section 26 and display section 24. The graphics accelerator 16 in FIG. 3 is also included in the functions of the display section 24.

Figure 5:
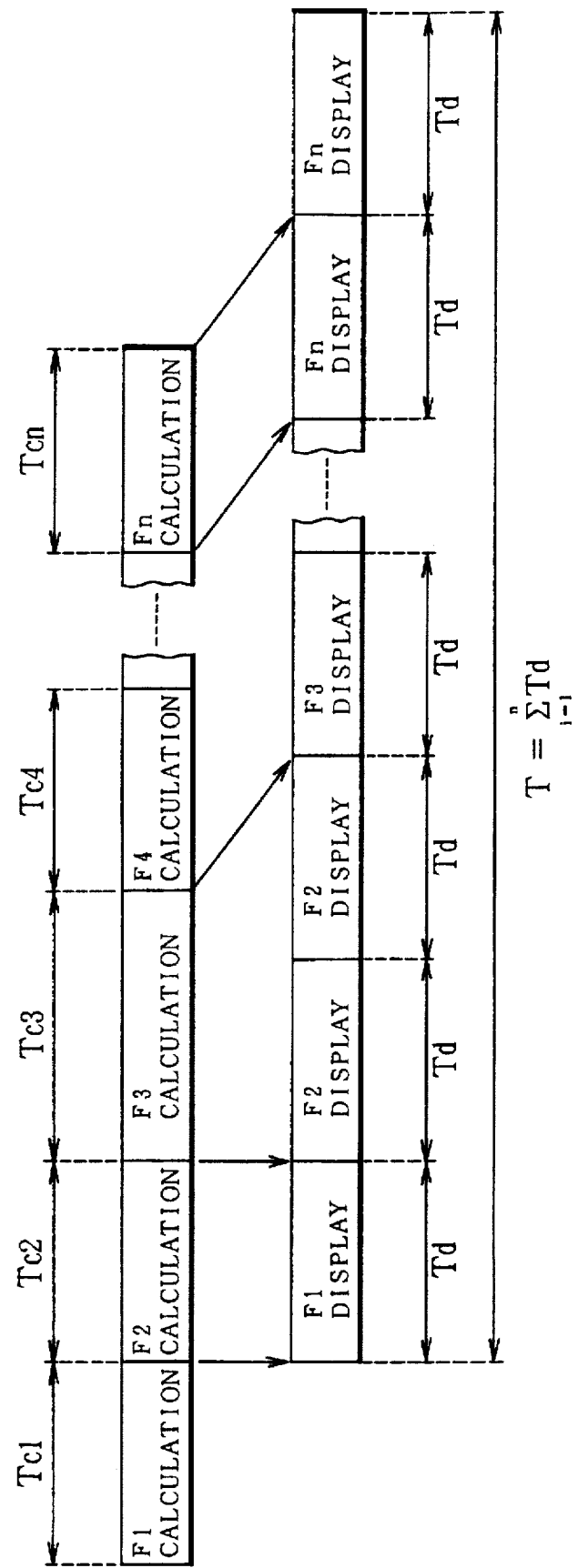
FIG. 5 is a timing chart for parallel processes of a calculating section and a display section in FIG. 4.

FIG. 5 is a timing chart in the case where the display interval of the moving image by the time control section 26 is set to a predetermined time Td and the formation of the moving images of (n) frames is shown as an example.

In FIG. 4, the time control section 26 first generates the activation command to the calculating section 22 and allows the calculating process of the moving image data to precede. For this purpose, as shown in FIG. 5, the calculating process of the first frame F1 is performed, so that the calculation time is set to Tc1. When the calculation result is stored to the calculation result accumulating section 28 by the end of the calculation of the first frame F1, the time control section 26 generates the activation command to the display section 24, thereby starting the display process of the first frame F1. The time of the display process of the first frame F1 in the display section 24 is started by the time control section 26. When the time reaches the preset time Td, a new display command is generated, thereby switching to the display process of a next second frame F2. On the other hand, in the calculating section 22, subsequent to the end of the calculation of the first frame F1, the calculation of the moving image data of the second frame F2 after the elapse of a certain time interval is started. In this case, the calculation of the second frame F2 has already been finished before reaching the display time Td at which the first frame F1 is displayed. Therefore, when receiving the display command for the display start of the second frame, the display section 24 immediately reads out the calculation result of the second frame F2 from the calculation result accumulating section 28 and starts the display process.

With respect to a next third frame F3, it takes a long time for the calculation of the moving image data. The calculation result of the third frame is not derived even when the display time Td of the second frame F2 is finished. In the case where it takes a long time for the calculation of the moving image data as mentioned above, the display section 24 performs the same display process of the second frame F2 as that at the preceding time for the new display command from the time control section 26. Specifically speaking, the moving image of the second frame F2 stored in the frame memory of the graphics accelerator 16 in FIG. 3 is continuously displayed on the color display 18. When time Tc3 is required for the calculation of the third frame F3 and the calculation result is obtained, the display process of the third frame F3 is performed on the basis of the calculation result of the third frame F3 after the display of the second frame F2 which was continuously displayed two times. In a manner similar to the above, the calculation processes and the display processes from a fourth frame F4 to a final frame Fn are simultaneously performed in parallel.

As a result, in case of assuming that the capacity of the calculation result accumulating section 28 is enough and no waiting time occurs in the reading mode of the calculation result for every frame, the moving image display time of (n) frames is obtained by the following equation.

$$T = \sum_{i=1}^{n} Td$$

Figure 1:
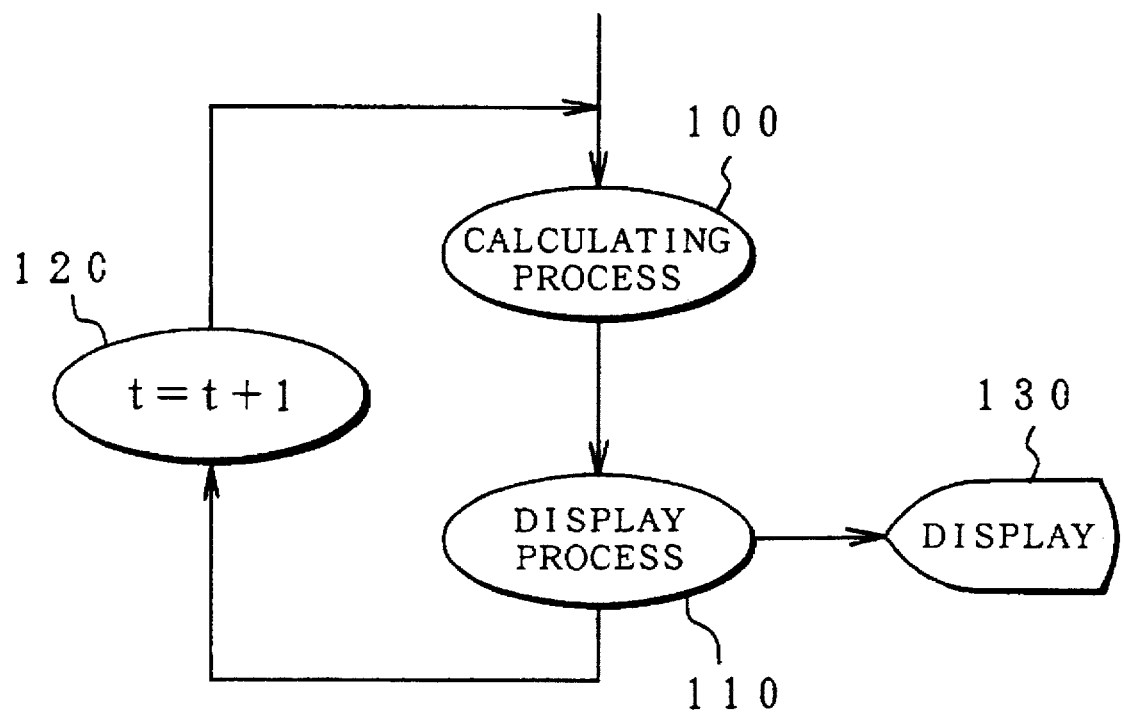
FIG. 1 is an explanatory diagram of a conventional process for forming moving image data.
Figure 2:
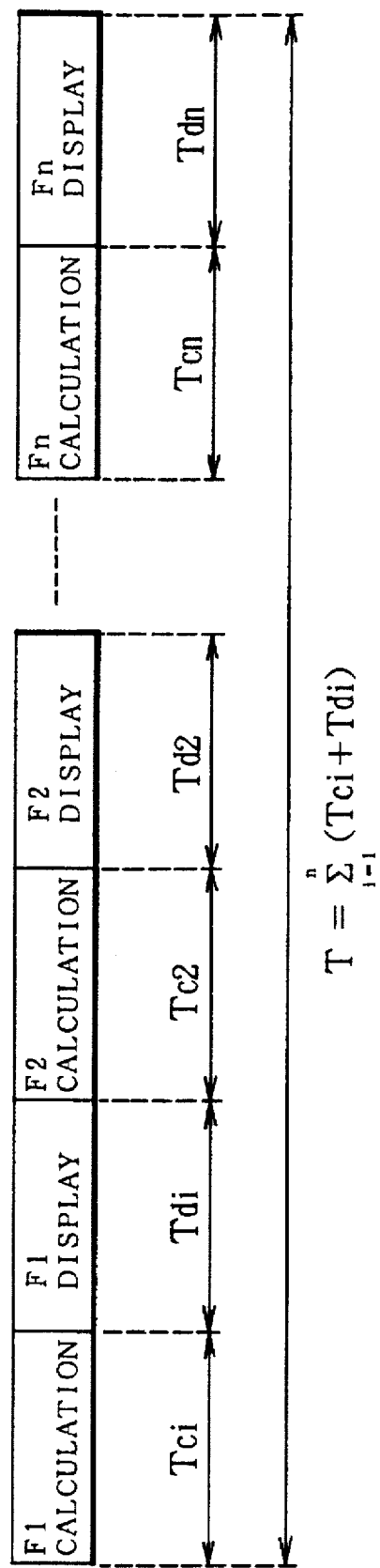
FIG. 2 is a timing chart showing conventional successive processes comprising a calculating process and a display process.

That is, the display can be realized by the half processing time as compared with that of the conventional successive processes of the calculating process and the display process in FIG. 2.

Figure 6:
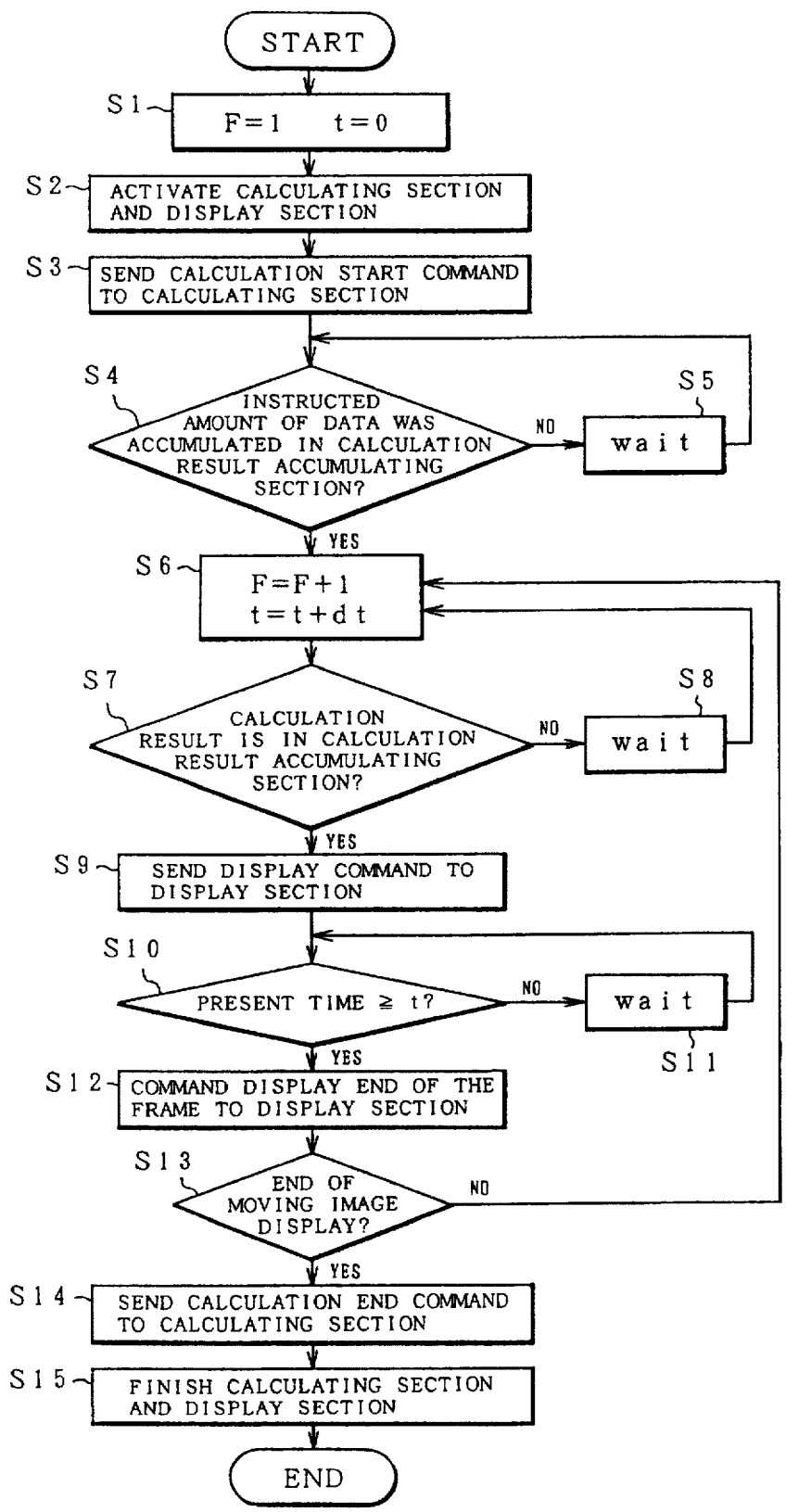
FIG. 6 is a flowchart for a processing operation of a time control section in FIG. 4.

A flowchart of FIG. 6 shows a processing operation by the time control section 26 in FIG. 4. (F) denotes a frame number; (t) an elapsed time from the display start; and (dt) a time interval of the display.

In FIG. 6, when the moving image forming process is started, an initializing process to set the frame number F=1 and the time t=0 is first performed in step S1. In step S2, the calculating section 22 and display section 24 are made active, thereby setting the operating state. In this instance, although the calculating section 22 and display section 24 are independent processing units, those processes can be performed in parallel. For example, in the case of using UNIX as an OS, those processes are set to different processes, thereby performing the multiprocess. In step S3, a calculation start command is sent to the calculating section 22 so as to start the calculation. The transmission of the calculation start command can be realized by a method of sending a message on a processing unit basis whereby processes can be independently performed in parallel. For instance, in case of UNIX, the calculation start command can be sent to the calculating section 22 by a communication between processes.

In the next step S4, a check is made to see whether a certain designated amount of moving image data (as a calculation result by the calculating section 22 which started the calculating operation by the calculation start command) has been accumulated in the calculation result accumulating section 28 or not. Specifically speaking, a check is made to see whether the calculation result of one frame has been accumulated in the calculation result accumulating section 28 or not. In the case where the instructed amount of data is not accumulated, in step S5, after waiting for only a certain time, a discrimination about the instructed amount of data accumulation in step S4 is performed again. In the case where a time for the calculation of the moving image data exceeds the time interval Td of the display set as a predetermined period of time, the process in step S4 waits until the instructed amount of data accumulation is performed as a function (which precedes the calculating process of the moving image data). Namely, even if the time required for the calculation of the moving image data exceeds the display time interval Td, the calculating process of the moving image data for a period of time exceeding the display time interval Td can be performed without stopping the calculation of the moving image data. When it is judged that the instructed amount of data of the calculation result has been accumulated in the calculation result accumulating section 28 in step S4, the processing routine advances to step S6 and a value of the frame number (F) is increased by one. The elapsed time (t) from the display start is advanced by only the time Td to display. Thus, the frame number F denotes the next frame and the elapsed time (t) denotes the display end prescribed time of the present frame.

In the next step S7, a check is made to see if the data of the calculation result has been accumulated in the calculation result accumulating section 28 or not. When there is no data of the calculation result, a new moving image display based on the new calculation result cannot be performed. Therefore, in step S8, the apparatus waits until the time to start the display of the next frame. The processing routine is returned to step S6 and the display contents of the present frame are held as they are. When the calculation result exists in the calculation result accumulating section 28, step S9 follows and a display command is sent to the display section 24. In step S10, until the present time reaches the display end prescribed time (t) set in step S6, the process waits for a certain time in step. When the present time reaches the display end prescribed time (t), step S12 follows and the end of display of the relevant frame is instructed to the display section 24. Thus, the display of the moving image of one frame is finished.

Subsequently, in step S13, a check is made to see if the display of the moving image has been finished or not. The end of the display of the moving image is recognized by a command by the operator or by the end of display of the final frame. When the moving image display is not finished, the processing routine is again returned to step S6 and the display process of the next frame is executed. When the end of the moving image display is discriminated in step S13, a calculation end command is sent to the calculating section 22 in step S14. In step S15, a process to finish the calculating section 22 and display section 24 is executed. The above series of processes are finished.

Figure 7:
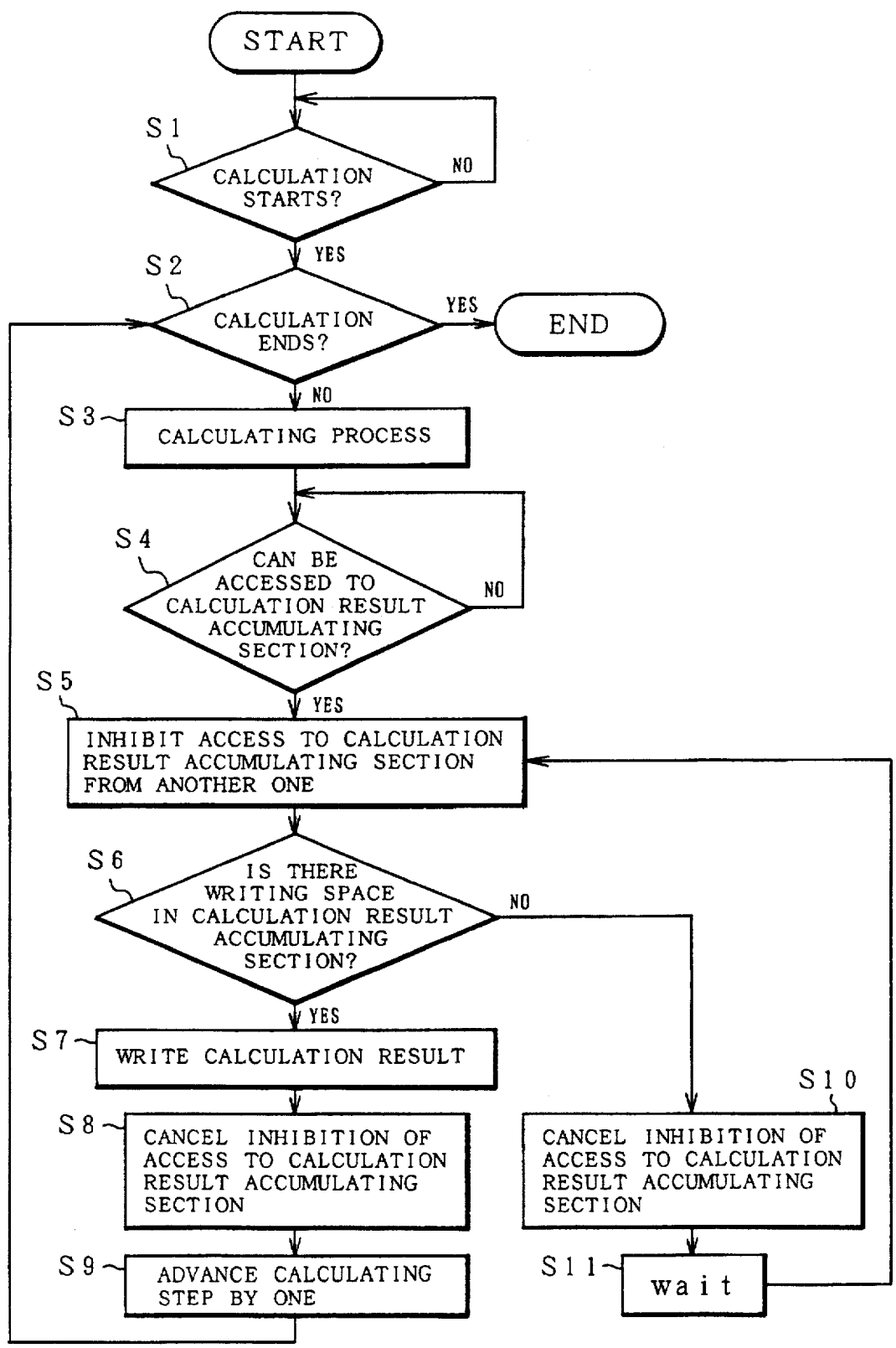
FIG. 7 is a flowchart for a processing operation of the calculating section in FIG. 4.

A flowchart of FIG. 7 relates to a processing operation of the calculating section 22 in the invention of FIG. 4. First in step S1, a check is made to see if a calculation start command has been inputted from the time control section 26 or not. When the calculation start command is inputted, step S2 follows and a check is made to see if a calculation end command has been inputted or not. When the calculation end command is not inputted, step S3 follows and the calculating process of the moving image data of one frame is executed. The calculating processes of the moving image data in step S3 are as shown in, for example, FIGS. 8A to 8C.

Figure 8A:
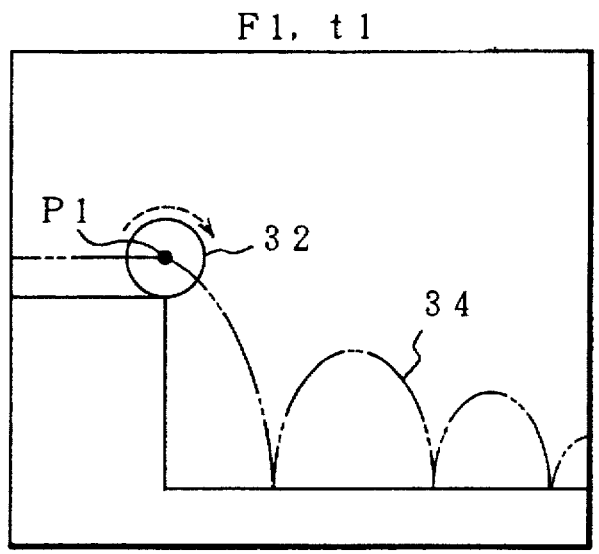
FIGS. 8A to 8C are explanatory diagrams of calculation examples of moving image data.
Figure 8B:
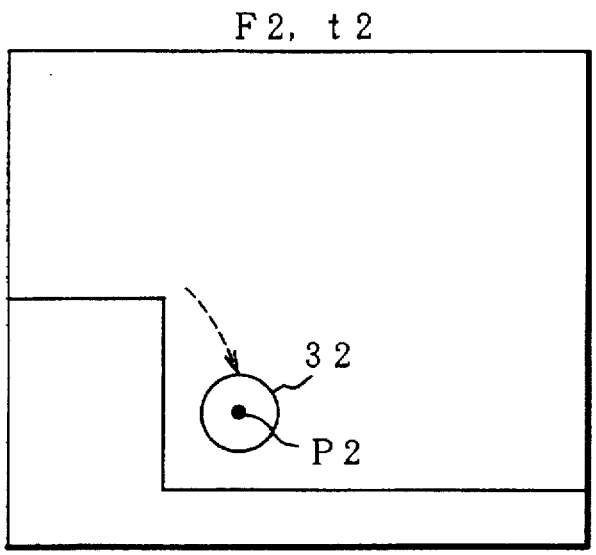
Figure 8C:
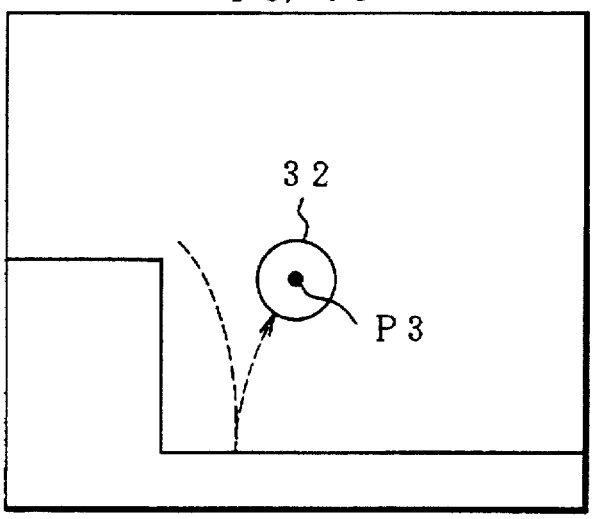

FIG. 8A diagrammatically shows a calculation result of moving image data of the first frame F1. Although the calculation is actually executed in a 3-dimensional space, it is shown in a 2-dimensional space for simplicity of explanation. In FIG. 8A, an image just before a rolling ball 32 drops is displayed. After the ball has dropped, a moving image such that the ball bounds as shown in a locus 34 is presumed. In such a case, an equation of motion has been preset with respect to the motion locus 34 after the ball 32 has dropped. When the time at each frame is decided, the position of the ball 32 on the motion locus 34 is determined as a solution of the motion equation. For example, when elapsed times t2 and t3 of second and third frames F2 and F3 in FIGS. 8B and 8C are decided for the first frame F1 in FIG. 8A, by substituting t2 and t3 into the equation of motion of the motion locus 34, positions P2 and P3 of the ball 32 at the second and third frames F2 and F3 can be unconditionally decided. Further, as data of the ball 32, equations of spheres are prepared and it is sufficient to obtain the center coordinates and radius for every moving image data in order to specify the ball 32. Further, since the background doesn't change every frame, it is formed as fixed data.

Referring again to FIG. 7, when the calculating process of the moving image data of one frame is finished in step S3, step S4 follows and a check is made to see if the calculation result accumulating section 28 can be accessed or not. If YES, the access from another process to the calculation result accumulating section 28 is inhibited in step S5 and the access is occupied by the calculating section 22. In step S6, a check is made to see if there is a writing space in the calculation result accumulating section 28 or not. If YES, the calculation result is written in step S7. After the calculation result was written, the inhibition of the access to the calculation result accumulating section 28 is cancelled in step S8. In step S9, the calculating step is advanced by one step and the processing formation timing is switched to the timing to form the moving image of the next frame. The processing routine is returned to step S2. On the other hand, when there is no writing space in the calculation result accumulating section 28 in step S6, step S10 follows and the inhibition of the access to the calculation result accumulating section 28 obtained in the calculating section 22 is cancelled, thereby releasing for the process by another process. In step S11, the apparatus waits for a certain time and the processing routine is again returned to step S5. The access to the calculation result accumulating section 28 then inhibited and the writing is again tried. When there is no writing space in the calculation result accumulating section 28, processes for erasing the calculation result of the frames (in which the display process by another process such as a time control section 26 was finished and thereby assuring an empty space) are separately executed.

Figure 9:
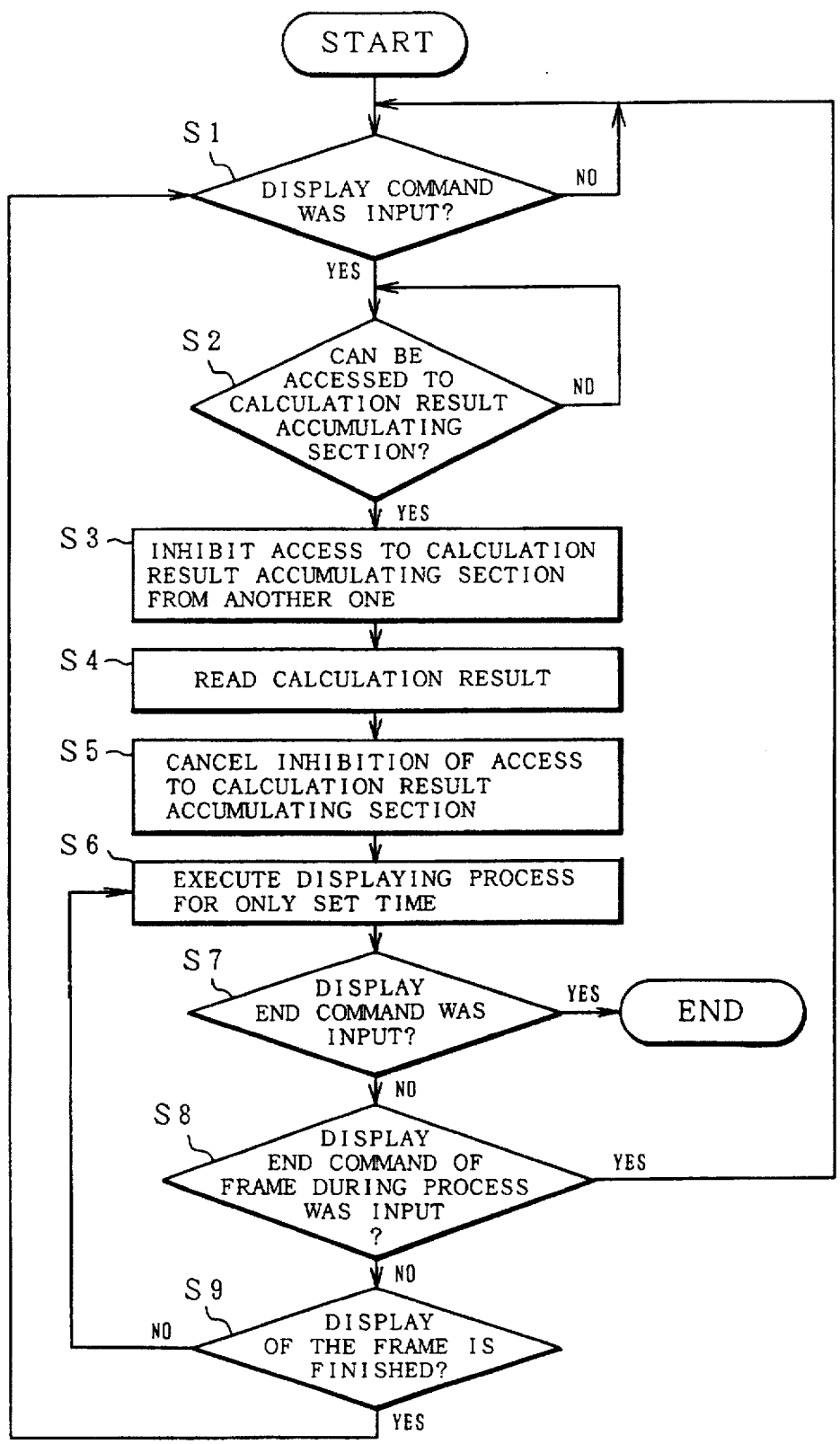
FIG. 9 is a flowchart for a processing operation of the display section in FIG. 4.

A flowchart of FIG. 9 relates to the processing operation of the display section 24 in FIG. 4. First in step S1, a check is made to see if a display command has been inputted from the time control section 26 or not. If YES, step S2 follows and a check is made to see if the calculation result accumulating section 28 can be accessed or not. If YES, step S3 follows and the access to the calculation result accumulating section 28 from another process is inhibited and the access is occupied by the display section 24. In step S4, the calculation result is read out from the calculation result accumulating section 28. The inhibition of the access to the calculation result accumulating section 28 is cancelled in step S5. In step S6, the display process is performed for only a preset time Td on the basis of the result of the reading operation from the calculation result accumulating section 28. The display process for such a set time is managed by the time control section in FIG. 6. In step S7, a check is made to see if the display end command has been sent from the time control section or not. If YES, the series of processes are finished. If the display end command has not been sent, step S8 follows and a check is made to see if a display end command of the frame under processing has been inputted or not. If NO, a check is made in step S9 to see if the display of the frame has been completed or not. The processes from step S6 are repeated until the display of the frame is completed. After completion of the frame display, the processing routine is returned to step S1 and the apparatus waits for the next display command.

Figures 10, 11:
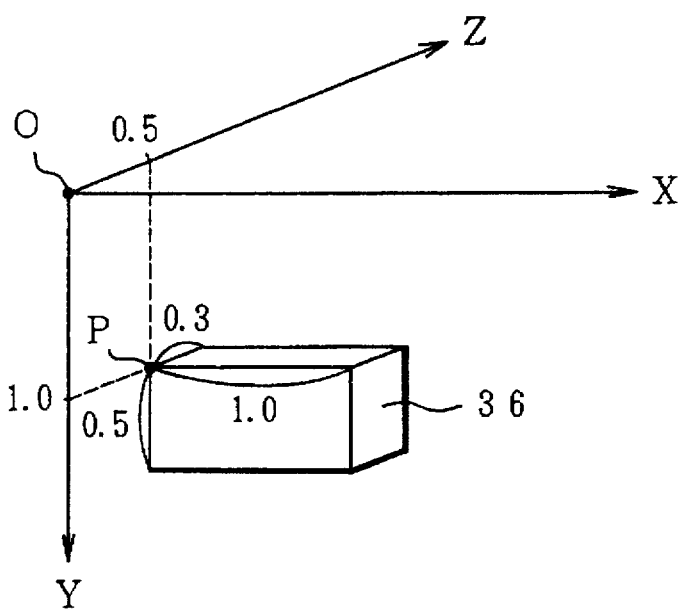
FIG. 10 is an explanatory diagram of a 3-dimensional object which is obtained in the invention.
FIG. 11 is an explanatory diagram of the moving image data calculated with respect to an object in FIG. 10.

The data storage of the calculation result for the calculation result accumulating section 28 which is used in the invention will now be described. It is now assumed that data of an object 36 in a 3-dimensional space as shown in FIG. 10 was formed by the calculating section FIG. 11 shows an example of the calculation data about the object 36 in FIG. 10. In this case, the designated color of the object 36 is set to "red" and the coordinates (location) of a reference point (P) of the object 36 are set to (x, y, z)=(0.0, 1.0, 0.5). Sizes in the xyz directions showing the dimensions of the object 36, namely, what is called a scale is set to (x=1.0, y=0.5, z=0.3). The calculation data of the object formed as shown in FIG. 11 is stored into the file unit 14 or the main storage unit 12 (memory) in FIG. 3.

The case of using the file unit as a calculation result accumulating section 28 will be first described. In case of storing into the file unit, a file for accumulation of the calculation result as shown in FIG. 12 is formed and the calculation result is written therein. The file is constructed by color data, a position X coordinate value, a position Y coordinate value, a position Z coordinate value, an X-direction span value, a Y-direction span value, and a Z-direction span value. In case of forming and storing a file of FIG. 12 from the calculation result in FIG. 11, the file has a data structure shown in the first data in FIG. 13. The calculation result data regarding one or a plurality of objects which are necessary to form moving images of one frame as mentioned above has, for example, a data structure of FIG. 12 and is sequentially stored into the file unit 14 in accordance with the order as shown in FIG. 13.

The case of using a memory as a calculation result accumulating section 28 of the main storage unit 12 in FIG. 3 will now be described. In the case where the calculating section 22 and display section 24 for moving image formation of the invention are realized by the C language, the calculation result data is accumulated into the memory by using an array or structure of the C language.

Figure 14:
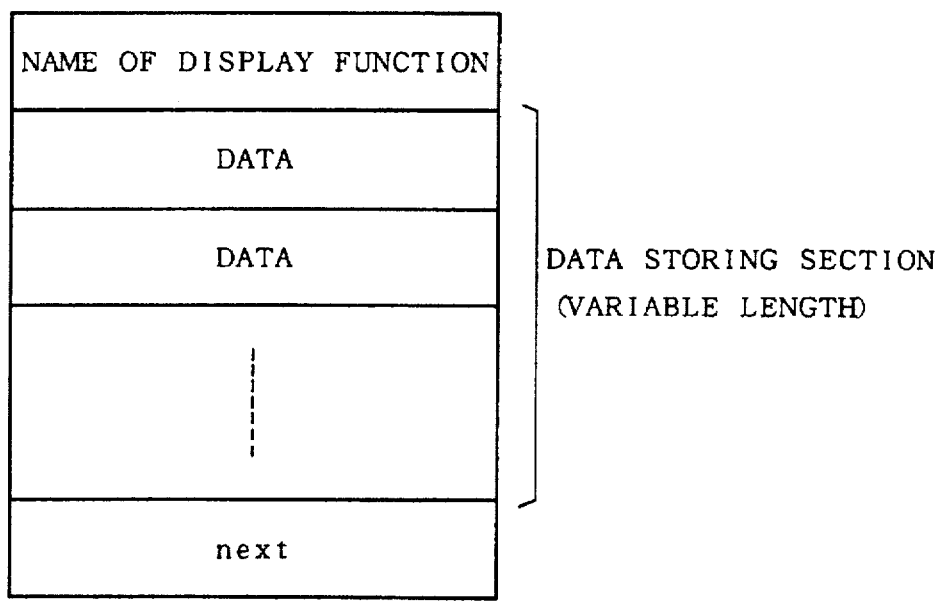
FIG. 14 is an explanatory diagram of a data structure which is stored in a memory.

FIG. 14 shows an example of a data structure to be stored into the memory. The data structure is characterized in that in addition to one or a plurality of variable length data storage sections, a display function name as a function name which is used in the display process is also included in the data structure and the resultant data structure is described. When the display function name is included in the data structure as mentioned above, and when the data structure is read out and the display process is executed by the display section 24, different data can be handled by a single function and complicated case division is not needed, so that the display process can be simplified.

Figure 15:
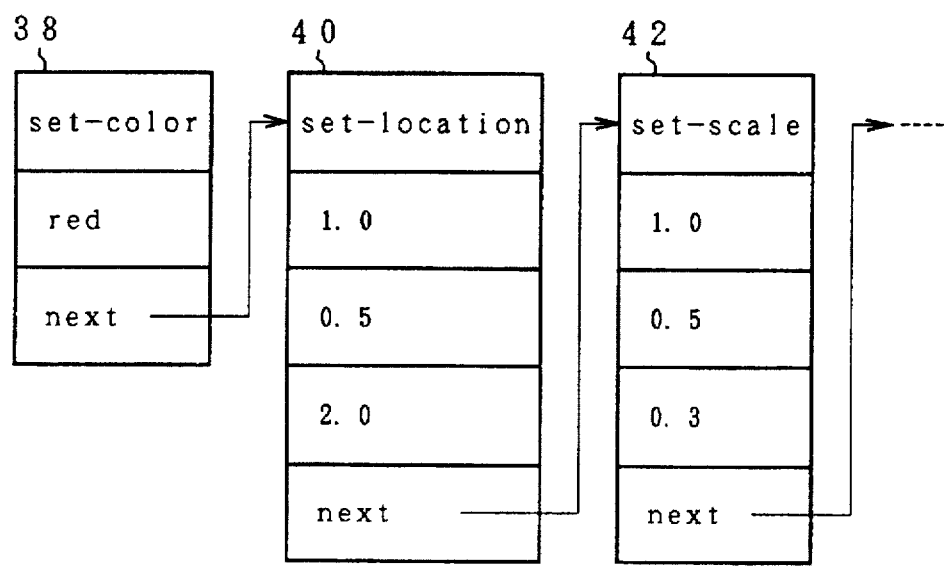
FIG. 15 is an explanatory diagram of a specific example of the data structure in FIG. 14.

FIG. 15 shows a data structure in case of storing the calculation result data in FIG. 11 into the memory by using the data structure of FIG. 14. In this case, three data structures 38, 40, and 42 are formed and "set-color", "set-location", and "set-scale" are used as functions to execute the display. Subsequent "red" and numerical values show set values which are given by each function.

Figure 16:
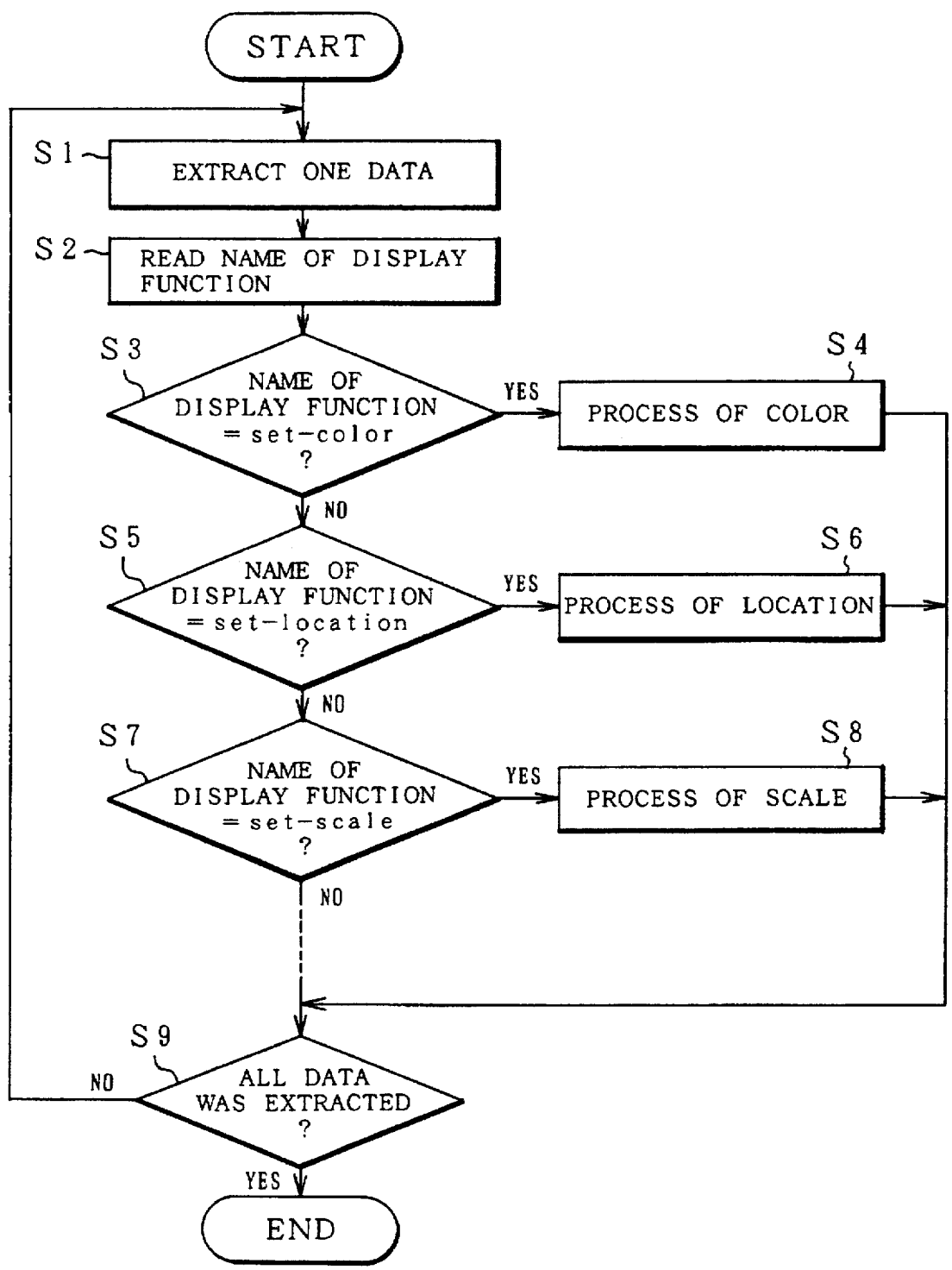
FIG. 16 is a flowchart for a display process using the data structure in FIG. 15.

FIG. 16 shows a display process in the display section 24 of the invention using the data structures of FIG. 15. First, one of the data structures is extracted in step S1 and the display function name in the data structure is read in step S2. Since the display function name of the first data structure 38 is "set-color", it is discriminated in step S3. In step S6, the process of the color according to the set value "red" subsequent to the display function name is performed. The data structure 40 is subsequently extracted. Since the display function name is "set-location" in this case, it is discriminated in step S5. The process of the position regarding the position coordinates (1.0, 0.5, 2.0) subsequent to the display function name is executed. With respect to the extraction of the next data structure 40, further, the display function name "set-scale" is discriminated in step S7. The process of the scale according to each of the scales (1.0, 0.5, 0.3) in the xyz directions is executed in step S8. In the actual moving image data formation, there are a number of other display function names and they are discriminated. The processes are repeated until the extraction of all of the data structures in step S9 is finished. In the case where the calculation result data including such display function names in the data structures is accumulated by using the memory, there is no need to form the function every kind of data on the display section side to execute the display. All of the data can be handled by one function such as "set". On the other hand, in the case where no display function name is included in the calculation result data, the type of data is examined and is divided for every calculation result data read out. Or, in the case where the data types are substantially equal, like a position and a scale, they cannot be judged from the data type. Therefore, complicated processes such as to previously decide the order of the data and to discriminate are necessary. According to the invention, however, since the display function name is included in the data structure, such complicated processes can be made unnecessary.

Figure 17:
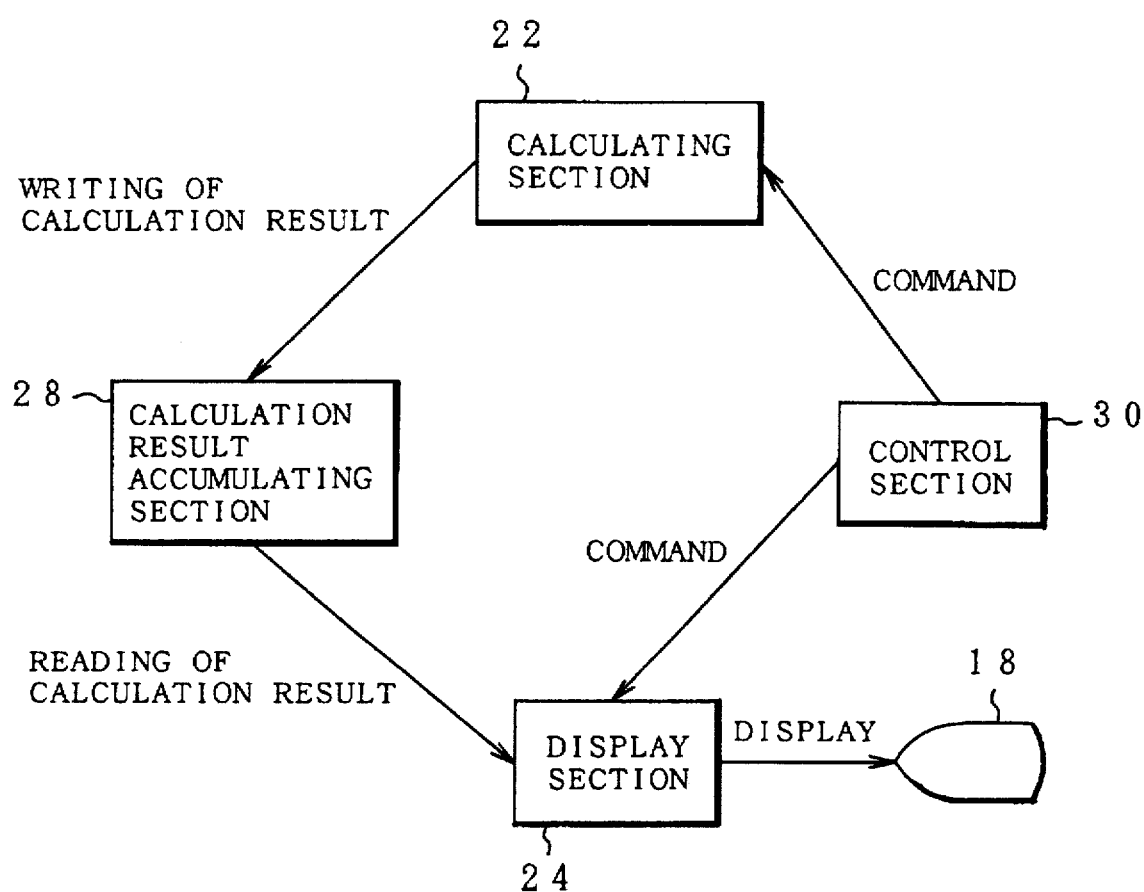
FIG. 17 is a functional block diagram of the second embodiment of the invention in which a display time interval is set to a variable length.

FIG. 17 shows a functional block diagram of the second embodiment of a moving image data forming apparatus according to the invention. The second embodiment is characterized in that a single control section 30 is provided in place of the time control section 26 in the first embodiment of FIG. 4 and the display interval by the display section 24 is not set to the constant interval but the time which is required for the actual data display is reflected as it is. According to the second embodiment, since the processing performance of the display section 24 is high, the embodiment can be applied to a case such that the display exceeding a display speed of 30 frames per second or more which is necessary for the moving image display can be always effected.

Figure 18:
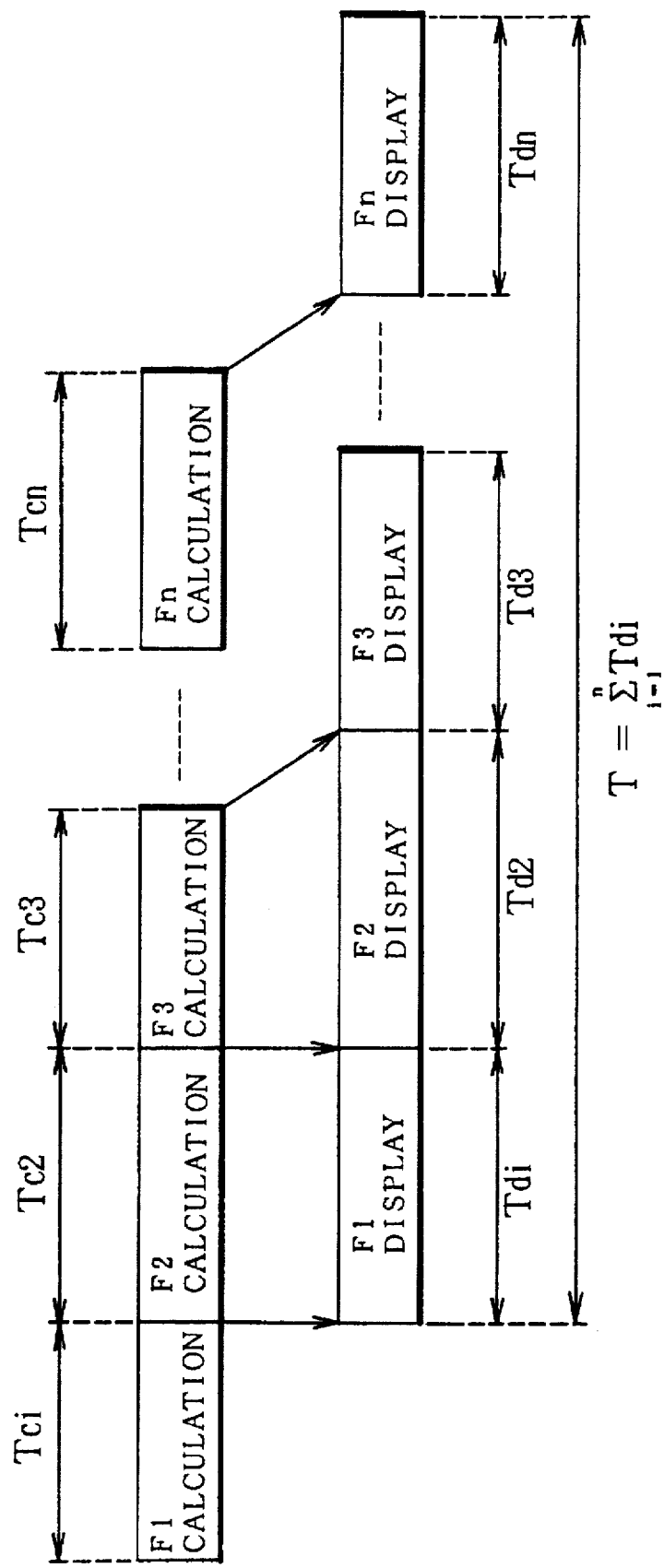
FIG. 18 is a flowchart for a parallel process of a calculating section and a display section in FIG. 17.

A timing chart of FIG. 18 shows the parallel processes by the calculating section 22 and display section 24 in the second embodiment of FIG. 17. Even in this case as well, the calculating process of the calculating section 22 precedes in response to a command from the control section 30. The calculation of the moving image data of the first frame F1 is first executed. After completion of the calculation of the first frame F1, the calculation result is written into the calculation result accumulating section 28. Subsequently, the display process of the first frame F1 by the display section 24 is started by a command from the control section 30. The display time by the display section 24 is not managed by the control section 30. When the display process of the first frame F1 is finished for a Td1 time, the processing mode is switched to the display process of the next second frame F2.

In this case, since the calculation result of the second frame F2 by the calculating section 22 has been obtained at the end time point of the display time Td1 of the first frame, the processing mode is soon switched to the display process of the second frame F2. In a manner similar to the above, with respect to any one of the calculating section 22 and display section 24, the process of shifting from the actual display time in each of them to the process of the next frame is repeated until the final frame Fn.

Figure 19:
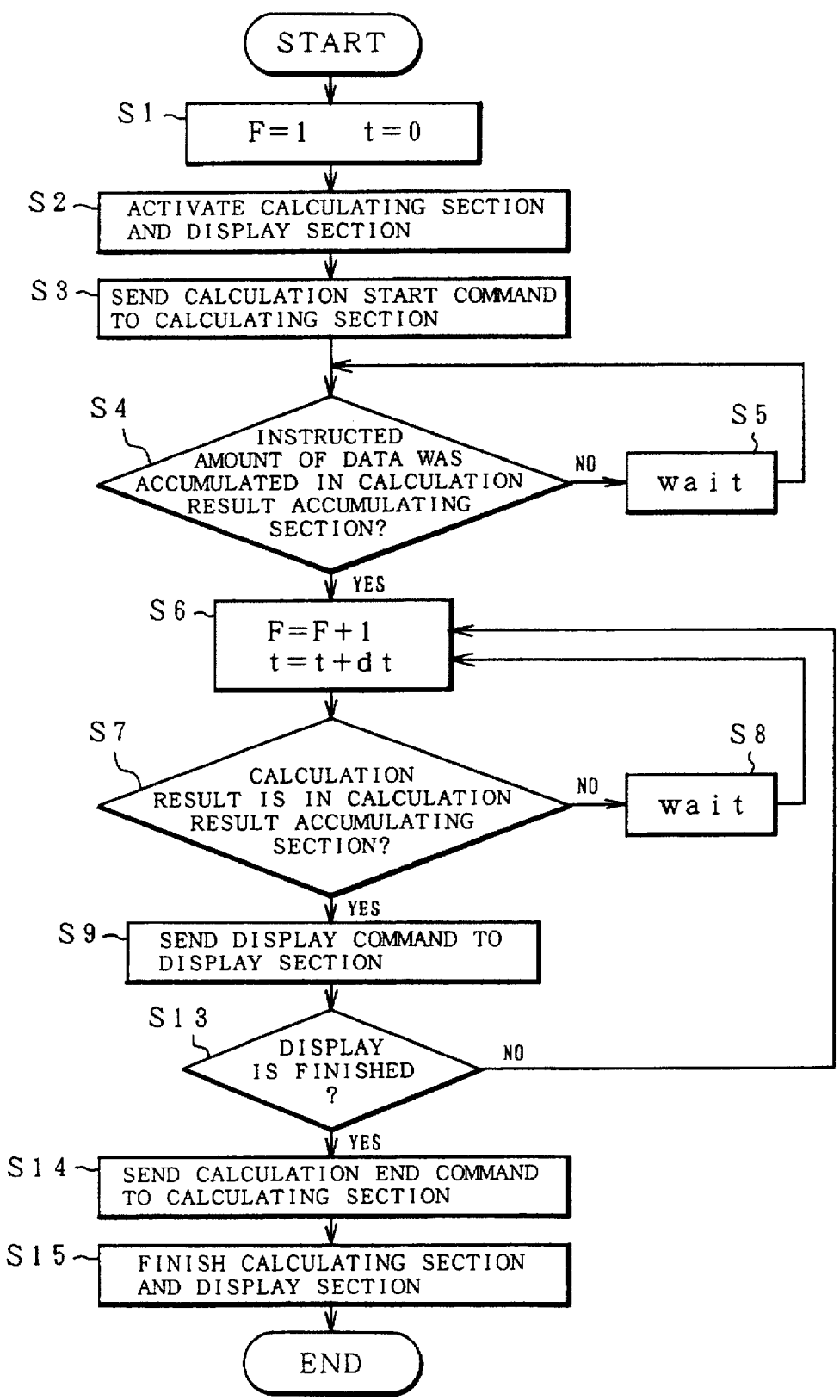
FIG. 19 is a flowchart of a processing operation by a control section in FIG. 17.

A flowchart of FIG. 19 shows the processing operation of the control section 30 provided in the second embodiment of FIG. 17. The flowchart of FIG. 19 is similar to that of FIG. 6 except that the processes of the display time interval in steps S10 to S12 by the time control section 26 are eliminated.

According to the invention as mentioned above, by the parallel processes by the multiprocess of the calculation of the moving image data and the display of the moving image data, the moving images can be displayed at shorter time intervals. The moving images can be displayed at regular time intervals without executing the batch process such that after the moving image data was stored into the memory or the like, it is read out and displayed. Even at the time of edition upon formation of the moving images, the edition result can be confirmed in a state near the completion state. The formation of the moving images and the editing work can be efficiently executed. The invention is not limited by the numerical values shown in the embodiments.

What is claimed is:

1. A method of forming and displaying a moving image in a real-time manner on a display, comprising:

a calculation step of continuously calculating and forming moving image data in real time and in 3-dimensional virtual space for a plurality of points in time ending at successive predetermined time intervals (Td), by a first processor;

a calculation result accumulation step of accumulating the 3-dimensional moving image data formed by said calculation step into a memory apparatus in real time;

a display conversion step of sequentially reading the 3-dimensional moving image data at said successive predetermined time intervals (Td) from said memory apparatus in real time by a second processor and in parallel with the calculation step and converting said 3-dimensional moving image data into 2-dimensional moving image data to realize a predetermined viewpoint, wherein a current 2-dimensional moving image data of said successively displayed 2-dimensional moving image data is continuously displayed until calculation of a next 3-dimensional moving image data is finished in said calculation step, and conversion of a current 3-dimensional moving image data into the current 2-dimensional moving image data is stopped if said conversion extends beyond a predetermined period of time and conversion of the next 3-dimensional moving image data into a next 2-dimensional moving image data is initiated; and a pixel forming step of sequentially converting the 2-dimensional moving image data produced in said display conversion step into pixel data for real time display on the display.

2. A method according to claim 1, wherein:

said calculation step calculates and forms the 3-dimensional moving image data as a plurality of successive picture planes corresponding to each of said successive predetermined time intervals (Td); and said display step displays the first picture plane of said plurality of successive picture planes when the first picture plane is accumulated in said memory apparatus.

3. A method according to claim 1, wherein said display step continuously displays a current 2-dimensional moving image data of said successively displayed moving image data until calculation of a next 2-dimensional moving image data is finished in said calculation step.

4. A method according to claim 1, wherein:
display of a current 2-dimensional moving image data, of said sequential 2-dimensional moving image data, is forcibly stopped if said current display extends beyond a predetermined period of time, and
a next 2-dimensional moving image data of said sequential 2-dimensional moving image data is displayed.

5. A method according to claim 1, wherein said calculation result accumulation step stores the 3-dimensional moving image data formed by said calculation step as a data structure including a display function name to designate at least a display color, a position, or a size of a display figure and data designated by said display function name.

6. A method according to claim 5, wherein in said display step, said data structures stored in the memory apparatus by said calculation result accumulation step are sequentially read out and the display process of the data is repeated in accordance with the display function names of said data structures.

7. An apparatus which forms and displays a moving image in a real-time manner on a display, comprising:
a moving image calculation processor which sequentially calculates and forms moving image data in 3-dimensional virtual space in real time;
a memory apparatus which stores 3-dimensional moving image data;
a calculation result accumulator which accumulates the 3-dimensional moving image data formed by said moving image calculation processor into the memory apparatus;
a display processor which converts the 3-dimensional moving image data read out from said memory apparatus into 2-dimensional moving image data to realize a predetermined viewpoint for moving image display;
a controller which controls said moving image calculation processor to continuously and sequentially calculate the 3-dimensional moving image data for a plurality of points in time ending at successive predetermined time intervals (Td), and which controls said display processor to sequentially read out and convert the 3-dimensional moving image data from said memory apparatus into 2-dimensional moving image data at said predetermined time intervals (Td) and in real time, wherein said controller continuously displays a current 2-dimensional moving image data of said sequentially converted 2-dimensional moving image data until calculation of a next 2-dimensional moving image data is finished by said display processor and forcibly stops conversion of a current 3-dimensional moving image data by said display processor and initiates conversion of a next 3-dimensional moving image data if conversion extends beyond a predetermined period of time; and
a graphics accelerator which converts the 2-dimensional moving image data read out from the controller into pixel data and outputs the pixel data to the display.

8. An apparatus according to claim 7, wherein:
said controller controls the moving image calculation processor to form the 3-dimensional moving image data as a plurality of successive picture planes corresponding to the successive predetermined time intervals (Td), and
said controller controls said display processor to calculate a first 2-dimensional picture plane when the first 3-dimensional picture plane is accumulated in said memory apparatus, thereby starting display of the moving image data.

9. An apparatus according to claim 7, wherein said controller continuously displays a current 2-dimensional moving image data of said sequentially converted 2-dimensional moving image data until calculation of a next 2-dimensional moving image data is finished by said display processor.

10. An apparatus according to claim 7, wherein said control section forcibly stops conversion of a current 3-dimensional moving image data of said sequentially read out 3-dimensional moving image data by said display processor and initiates conversion of a next 3-dimensional moving image data if conversion extends beyond a predetermined period of time.

11. An apparatus according to claim 7, wherein said calculation result accumulator stores the 3-dimensional moving image data calculated and formed by said moving image calculating processor as a data structure including a display function name to designate at least a display color, a position, or a size of a display figure and data designated by said display function name.

12. An apparatus according to claim 11, wherein said display processor sequentially reads out said data structures stored in said memory apparatus and repeats the conversion of 3-dimensional moving image data into 2-dimensional moving image data in accordance with the display function names of said data structures.

13. An apparatus which forms and displays a moving image in a real-time manner on a display, comprising:
a moving image calculation processor which sequentially calculates and forms moving image data in 3-dimensional virtual space;
a memory apparatus which stores 3-dimensional moving image data;
a calculation result accumulator which accumulates the 3-dimensional moving image data formed by said moving image calculation processor into the memory apparatus;
a display processor which sequentially converts the 3-dimensional moving image data read out from said memory apparatus into 2-dimensional moving image data to realize a predetermined viewpoint for moving image display;
a controller which controls said moving image calculation processor and said display processor to operate in parallel and in real time, wherein said controller continuously displays a current 2-dimensional moving image data of said sequentially converted 2-dimensional moving image data until calculation of a next 2-dimensional moving image data is finished by said display processor and said control section forcibly stops conversion of a current 3-dimensional moving image data and initiates conversion of a next 3-dimensional moving image data if conversion extends beyond a predetermined period of time; and
a graphics accelerator which converts the 2-dimensional moving image data read out from the controller into pixel data and outputs the pixel data to the display.

* * * * *

UNITED STATES PATENT AND TRADEMARK OFFICE
CERTIFICATE OF CORRECTION

PATENT NO. : 5,673,380
DATED : September 30, 1997
INVENTOR(S) : Suzuki

It is certified that error appears in the above-identified patent and that said Letters Patent is hereby corrected as shown below:

Cover Page, [57] ABSTRACT, line 10, after "provide" insert --the--.

Col. 5, line 1, "of" should be --by--;

line 2, "by" should be --of--.

Col. 6, line 3, after "data" insert --to precede the start of the display section 24--.

Col. 13, CANCEL claims 3 and 4 (delete lines 4-15).

Col. 14, CANCEL claims 9 and 10 (delete lines 9-21).

Signed and Sealed this

Fifteenth Day of September, 1998

Attest:

BRUCE LEHMAN

Attesting Officer     Commissioner of Patents and Trademarks